DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 10, 1972

903 O.G. 375

T903,033
APPARATUS FOR RECOVERING INDIVIDUAL FIBERS FROM A BONDED WEB OR BATT

Donald William Selby, 17 Ravine Road, Wilmington, Del. 19810

Filed Aug. 26, 1971, Ser. No. 175,070
Int. Cl. D01b *1/28;* D21f *1/66*
U.S. Cl. 162—261
1 Sheet Drawing. 11 Pages Specification

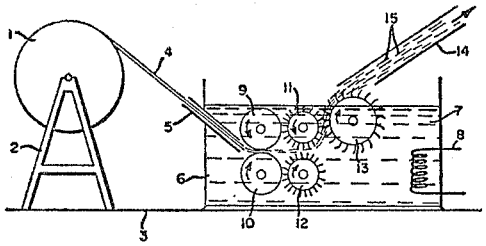

Apparatus for recovering individual, inflated, microcellular staple fibers from a group of such fibers which are bonded together with a thermoplastic adhesive as in a bonded web or batt which comprises a shute 5 for feeding bonded batts of the fibers below the surface of a heated liquid contained in an insulated tank 6, a series of combed-brush rollers positioned 11, 12 below the liquid level to contact the batt on opposite sides as the batt passes between them whereby the fibers of the batt are loosened and separated, and a stripping roll and suction duct for removing the separated fibers from the vessel. The separated fibers may then be reused, along with freshly made inflated, microcellular staple fibers, for making pneumacel fiber batts.

Oct. 10, 1972 D. W. SELBY T903,033
APPARATUS FOR RECOVERING INDIVIDUAL FIBERS FROM A BONDED WEB OR BATT
Filed Aug. 26, 1971
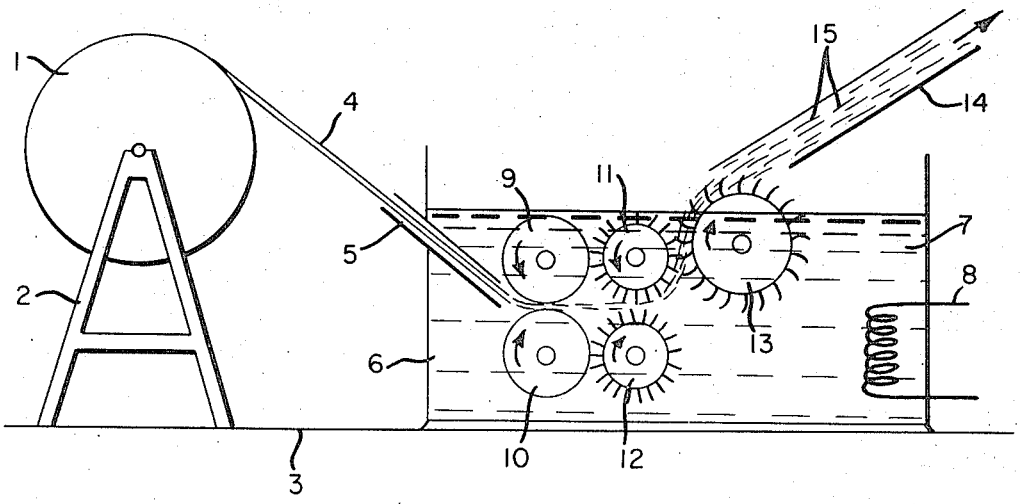
INVENTOR
DONALD WILLIAM SELBY
BY Gary A Samuels
ATTORNEY